United States Patent

Schwab

[15] 3,700,082
[45] Oct. 24, 1972

[54] DIFFERENTIAL DRIVE MECHANISM

[72] Inventor: Delmar G. Schwab, Portland, Oreg.

[73] Assignee: Hy-Torq Corporation, Portland, Oreg.

[22] Filed: July 9, 1970

[21] Appl. No.: 56,171

Related U.S. Application Data

[63] Continuation of Ser. No. 758,988, Sept. 11, 1968, abandoned.

[52] U.S. Cl. ..................................... 192/50, 74/650
[51] Int. Cl. ................................................ F16d 41/06
[58] Field of Search ................. 74/650; 192/50, 35

[56] References Cited

UNITED STATES PATENTS

| | | | |
|---|---|---|---|
| 2,086,432 | 7/1937 | Potter | 74/650 |
| 2,191,763 | 2/1940 | La Casse | 74/650 |
| 3,173,309 | 3/1965 | Seliger | 74/650 |
| 3,283,611 | 11/1966 | Weismann et al. | 74/650 |
| 3,300,002 | 1/1967 | Roper | 192/35 |
| 3,344,686 | 10/1967 | Baker | 74/650 |
| 3,437,186 | 4/1969 | Roper | 192/35 |
| 2,481,066 | 9/1949 | Bagge | 74/650 |
| 3,447,396 | 6/1969 | Seliger | 74/650 |

*Primary Examiner*—Carlton R. Croyle
*Assistant Examiner*—Thomas C. Perry
*Attorney*—Buckhorn, Blore, Klarquist & Sparkman

[57] ABSTRACT

A differential drive mechanism includes a driven body assembly adapted to drive or permit overrunning of either of two hubs through crowned rollers movable by cup-shaped cages having bottoms frictionally engaging damping bosses of an end cap and an inner flange of an integral body and also engaging friction actuating plugs carried by the hubs. Limited lost motion is provided between the hubs to permit one to be driven while the other overruns.

12 Claims, 5 Drawing Figures

DELMAR G. SCHWAB
INVENTOR

BY
BUCKHORN, BLORE, KLARQUIST & SPARKMAN
ATTORNEYS

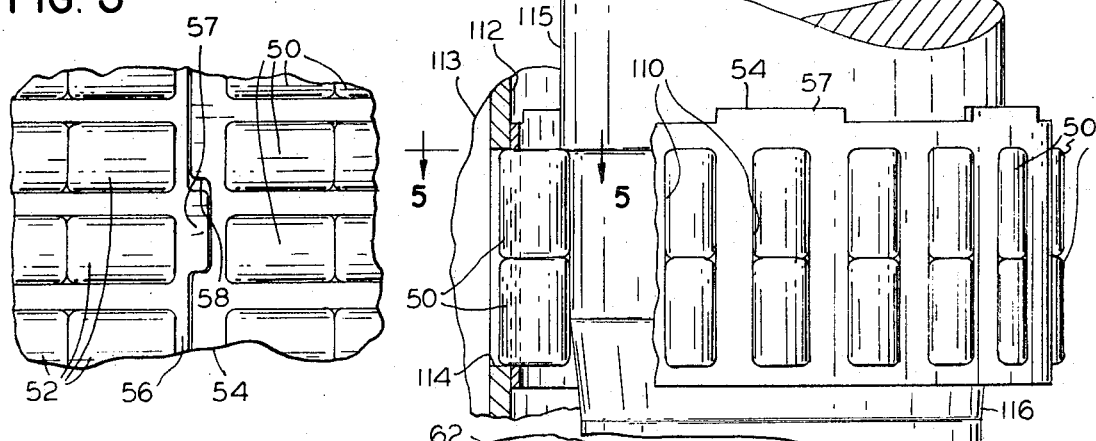
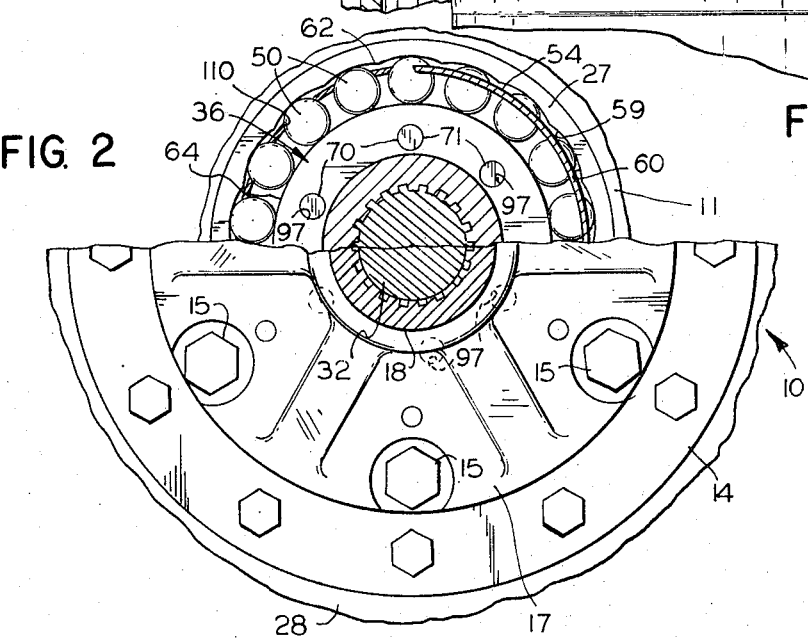
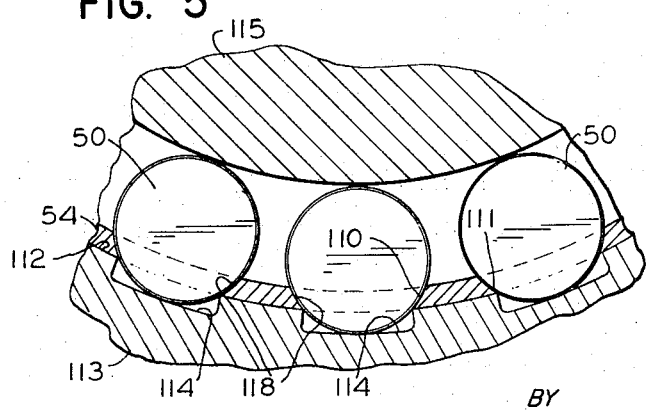

DIFFERENTIAL DRIVE MECHANISM

This is a continuation of application Ser. No. 758,988 filed Sept. 11, 1968, and now abandoned.

DESCRIPTION

This invention relates to an improved differential drive mechanism, and more particularly to an improved positively driving automobile differential drive mechanism.

An object of the invention is to provide an improved differential drive mechanism.

Another object of the invention is to provide an improved positively driving differential drive mechanism.

A further object of the invention is to provide a durable, non-slipping, non-hopping differential drive mechanism.

Another object of the invention is to provide a differential drive mechanism having a long wearing structure adapted to create or maintain either a driving condition or an overrunning condition of a hub for one of two axles individually coupled to a drive by the differential drive mechanism.

A further object of the invention is to provide a differential drive mechanism in which the ends or bottoms of a pair of loosely coupled cages frictionally engage actuating bosses of a driven body assembly and also frictionally engage spring-pressed actuating members carried by hubs connected to axles to be individually driven.

Another object of the invention is to provide a differential drive mechanism having axially operating actuating structures.

Another object of the invention is to provide a differential drive mechanism having axially operating damping structures.

Another object of the invention is to provide a differential drive mechanism having long wearing, heat insensitive actuating and damping structures.

The invention provides a differential drive mechanism having a body which drives a pair of hubs coupled to axles to be driven, the body being individually coupled to the hubs through two sets of rollers which may be moved to wedged driving positions by two cages having limited lost motion therebetween. The cages are individually actuated by actuators which preferably are axially operably, and dampers preferably operable axially tend to hold the cages to the body to prevent chattering or hopping. Preferably the cages are cup-shaped with the bottoms thereof being positioned between spring-pressed actuating plugs carried by the hubs and annular bosses carried by the body.

In the drawings:

FIG. 2 is a vertical sectional view taken along line 2—2 of FIG. 1;

FIG. 3 is an enlarged, fragmentary elevation of a portion of the differential drive mechanism of FIG. 1;

FIG. 4 is an elevation of a cage of the differential drive mechanism of FIG. 1 and a mandrel forming the cage in accordance with a method forming one embodiment of the invention; and FIG. 5 is an enlarged, fragmentary horizontal sectional view taken along line 5—5 of FIG. 4.

Figure 1:
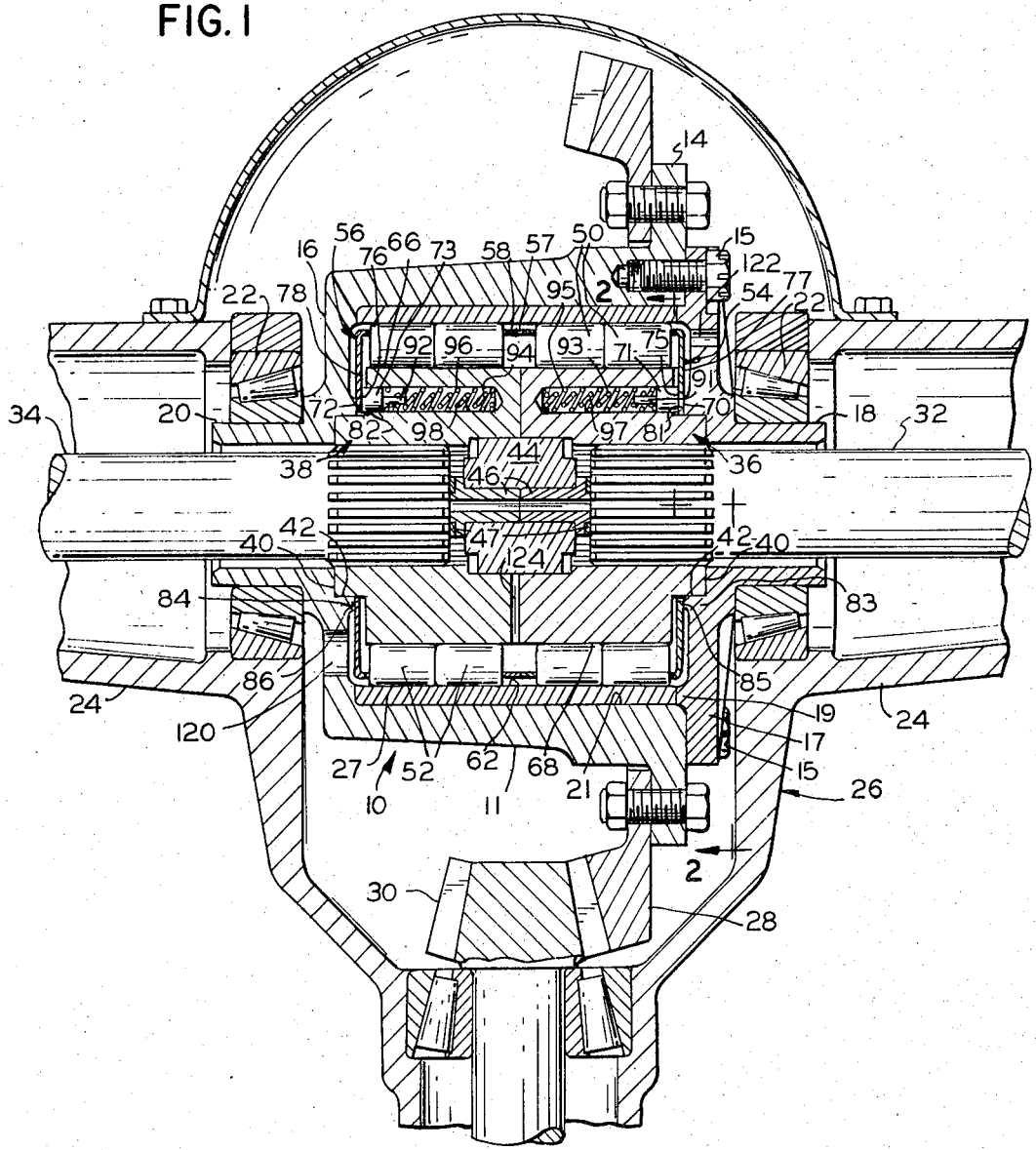
FIG. 1 is a longitudinal sectional view of an improved differential drive mechanism forming one embodiment of the invention.

Referring now in detail to the drawings, there is shown in FIGS. 1 to 3 an improved non-slip automobile differential forming a specific embodiment of the invention. The differential includes a drive casing having a forged steel body 10 having an internally cylindrical body portion 11 and an outer drive flange 14 and a radially ribbed flange 16 integral with the body portion. A radially ribbed cap 17 of ductile iron is bolted by capscrews 15 to the drive flange 14 and has an annular portion 19 fitting closely into cylindrical counterbore 21 in the body portion 11. Hub portions 18 and 20 on the cap 17 and the flange 16 are journaled in radial-and-thrust bearings 22 mounted in tubular axle housing portions 24 of a housing 26. A very hard liner sleeve 27 preferably of 52100 steel, is press fitted into counterbore 21 in the body portion 11 after the body portion is heated and the liner is cooled and while the body portion is hot and the liner is cold.

A ring gear 28 bolted to the drive flange 14 is adapted to be driven by a pinion 30 to rotate the body 10, and cap 17 and the flanges 14 and 16. Axles 32 and 34 are splined to abutting hubs 36 and 38 which have tubular hub portions 40 journaled in counterbores 42 in the cap 17 and the flange 16. The hubs 36 and 38 rotate freely relative to each other and to the hubs 14 and 16. The hubs 36 and 38 are preferably of SAE 52100 steel or SAE 8620 steel, and are case hardened, oil quenched and tempered after quenching. A spacer 44 journals flanged, tubular inserts 46 carrying washers 47 engaging the ends of the axles 32 and 34.

Pairs of identical, crowned bearing rollers 50 and 52 are rotatable in cup-shaped or radially flanged cages 54 and 56 spacing the pairs of rollers laterally apart and preventing endwise movement of the rollers while freely permitting rolling of the rollers. The cages have key portions 57 (FIGS. 1 and 3) extending loosely into keyways or notches 58 in the cages to permit a predetermined rotative motion between the cages 54 and 56, whereby one of the cages can move to a roller freeing position relative to the body 10 while the rollers in the other cage are in an operative or drive position relative to the body 10. When either of the cages is in its roller freeing position, the rollers 50 or 52 held in that cage are substantially centered between and out of engagement with ramps 59 and 60 of axially parallel teeth or scallops 62 on the inner peripheral portion of the body, and the rollers 50 or 52 rotate freely on the cylindrical outer surface 64 of the hub 36 or on cylindrical outer surface 66 of the hub 38, to permit that hub to overrun the body 10 when the other hub is being driven. When the cages are both in their drive positions, the ramps 59, for forward drive, or the ramps 60 for reverse drive, engage all the rollers 50 and 52 and wedge them against the surfaces 64 and 66 to drive both the hubs 36 and 38 in the same direction.

To move the rollers 50 and 52 into wedged, driving engagement with the hubs 36 and 38 when the body 10, the liner 27 and the cap 17, which are rigid with each other and are referred to hereinafter as the body assembly, are rotated, planar circular surfaces 70 and 72 of spring pressed actuating plugs 71 and 73 on the cap 17 and flange 16, respectively, frictionally engage planar annular inner surfaces 75 and 76 of the radially inward portion of ends or bottoms 77 and 78 of the cup-shaped cages 54 and 56. These frictional engagements retard the cages to wedge the rollers 50 and 52 between the liner 27 and the hubs 36 and 38 to drive the hubs 36 and 38 and the axles 32 and 34. If one of the axles 32 or 34 starts to overrun the body assembly, the hub 36 or 38 moves the rollers forwardly and out of driving engagement with the liner 27 as permitted by the loose or lost motion connecting keys 57 and notches 58 of the cages 54 and 56. Then friction between a planar, annular damping surface 81 of a damping boss 83 and an annular outer surface 85 of the radially inward portion of the end or bottom 77 of one of the races, or between a planar, annular damping surface 82 of a damping boss 84 and an outer surface 86 of the bottom 78 of the other race, tends to hold the cage in its overrunning or free running position. The damping actions of these damping structures prevent "hopping" or "chattering" back and forth between driving and free running conditions in the absence of a sustained need for driving or a sustained need for overrunning, the damping force being less than and proportional to the actuating force between the surfaces 75 and 81 or 76 and 82. Thus, the bottoms 77 and 78 serve both as actuating elements in cooperation with the plugs 71 and 73 and as damping elements with the bosses 83 and 84.

The actuating plugs or buttons 71 and 73 are cylindrical and have centered spring guiding pins 91 and 92 centered in inner compression springs 93 and 94 which are positioned in outer compression springs 95 and 96 positioned in longitudinal bores 97 and 98 in the hubs 36 and 38, respectively. The plugs 71 and 73 fit closely and freely slide in the bores 97 and 98 and are urged by the springs with uniform pressure against the bottoms 77 and 78 of the cages 54 and 56. As best shown in FIG. 2, the bores 97 and 98 are equidistant from the center of the hubs and are spaced non-uniformly, circumferentially, around the hub so that no more one of the bores 97 or 98 will be laterally aligned with one of the pairs of rollers 50 or 52 at any instant. The plugs preferably are of R–3956 asbestos friction compositions sold by the Raybestos-Manhatten Co.

The rollers 50 and 52 are crowned, preferably being from 0.0019 to 0.0025 inch lesser in radius adjacent rounded end corner portions than at the central portions of the rollers, which may be cylindrical for one-quarter of an inch or so. The rollers preferably are of AISI 4620 steel.

The rollers 50 and 52 project laterally into groove or scallops 62 in the sleeve 27 and are free running when in the central portions of the grooves while being wedged or driving when abutting wedging ramp portions 59 or 60, the wedging angle being between about 3° and about 6° as disclosed in more detail in a copending application Ser. No. 759,025 filed Sept. 11, 1968, now abandoned, and assigned to the same assignee as the instant application. The key portions 57 and notches 58 provide for about 1½° lost motion between the races which enables the rollers of one of the races to be in the free running positions centered in the grooves while the rollers in the other race are wedged against the ramp portions 59 or 60. The grooves 59 and 60 are parallel to the longitudinal centerline of the sleeve 27, are coextensive with the sleeve, and preferably are formed in the sleeve all at once by a multibroach tool before the sleeve is sweated and pressed into the body 10.

The cages 54 and 56 (FIGS. 1, 4 and 5) are preferably formed from low carbon, deep drawing steel, preferably ASM 569 steel. The sheet stock first is drawn into the form of a cap, and slots 110, the key portions 57 and notches 58 are formed therein. Inner corners 111 (FIG. 5) of the slots 110 then are somewhat sharp, being about 90°. To "wing" the races, the race is placed in a socket 112 in a backing retainer 113, the roller bearings 50 or 52 are placed in the slots 110 and longitudinal grooves 114 of the retainer and a mandrel 115 having a tapered entrance portion 116 is pressed hydraulically into the space between the rollers. This presses the rollers outwardly to swage out the corners 111 and form surfaces 118 conforming to the rollers 50 and 52. The races then are subjected to a nitriding process which surface hardens them and makes the surface porous and wear resistant. One suitable process of such nitriding is that of "Tuftriding" by the Kolene Corporation. The cages then have excellent wear resistance.

Oil is supplied to the moving parts through a port 120, along the rollers 50 and 52 to a port 122 and through a bore 124 and along the spacer 44 to the axles.

The above-described differential mechanism is durable, non-slipping, non-hopping and not temperature sensitive. By its construction, the slipping is prevented by low ramp angles and by the crowned rollers, large contact areas of the rollers on the sleeve and hubs, and the strength imparted to the body by the very hard sleeve, which is sweated in and under circumferential compression, prevents deformation of the sleeve from the high forces generated during the operation. The damping and actuating structure of the cages, the bosses and the plugs is very effective to effect driving and to prevent hopping from unsustained forces.

What is claimed is:

1. In a differential driving mechanism,
 a rotatable drive casing,
 a pair of driven hub members coaxially mounted in end to end relation in the drive casing for independent rotation,
 one of the drive casing on the one hand and the hub members on the other hand having ramps and the other being smooth,
 a pair of sets or rollers freely mounted between the drive casing and each of said driven hub members for circumferential movement between a released position and a driven position between the ramps and the other of the casing and the driven hub members in either direction by a wedging action of the rollers therebetween,
 a pair of annular cages for the rollers freely mounted concentrically in opposed relation on the driven hub members for adjustable rotation relative thereto,
 and a pair of frictional drag means including frictional actuators positioned between the ends of the hub members and the end of the cages and also including frictional dampers positioned between the ends of the casing and the ends of the cages.

2. The differential drive means of claim 1 wherein the cages include radial flanges frictionally engaging the frictional actuators and the frictional dampers.

3. The differential drive means of claim 2 wherein the frictional dampers comprise annular bosses on the inside faces of the ends of the casing and frictionally engaging the radial flanges of the cages.

4. The differential drive mechanism of claim 2 wherein the frictional actuators include frictional members carried by the hub members and pressed against the radial flanges of the cages.

5. The differential drive mechanism of claim 4 wherein the frictional members are plugs slidable in longitudinal bores in the hubs and including springs mounted in the bore urging the plugs against the radial flanges of the cages.

6. The differential drive mechanism of claim 5 wherein the ends of the casing are provided with annular bosses engaging the radial flanges of the cages.

7. The differential drive mechanism of claim 6 wherein the cages are cup-shaped and the radial flanges are the bottoms of the cups.

8. In a differential driving mechanism,
a rotatable drive casing having driving ramps,
a pair of driven hub members coaxially mounted in end to end relation in the drive casing for independent rotation,
a plurality of crowned rollers freely mounted between the drive casing and each of the driven hub members for circumferential movements between released positions and driven positions between the ramps of the casing and the driven hub members in either direction by a wedging action of the rollers therebetween,
a pair of annular cages for the rollers freely mounted on the driven hub members for adjustable rotation relative thereto,
frictional actuating means coupling the cages and the driven hub members,
and frictional damping means coupling the cages and the casing.

9. A differential driving mechanism comprising a rotatable drive casing having a cylindrical sleeve portion provided with longitudinal grooves of uniform transverse cross section forming ramps and also having end portions having bosses,
a pair of driven hub members coaxially mounted in end to end relation in the drive casing for independent rotation,
a pair of sets of rollers freely mounted between the drive casing and the driven hub members for circumferential movement between a released position and a driven position between the ramps and the hub members in either direction by a wedging action of the rollers therebetween,
a pair of cupped annular cages for the rollers freely mounted concentrically in opposed relation on the hub members for adjustable rotation and longitudinal movement relative thereto,
the bottoms of the cupped annular cages extending between the ends of the hub members and the bosses,
and a plurality of sets of frictional actuating members under compression between the bottoms of the cages and the hub members and urging the bottoms of the cages against the bosses.

10. In a differential driving mechanism, a rotatable drive casing,
a pair of driven hub members coaxially mounted in end to end relation in the drive casing for independent rotation and having end bores,
one of the hub members and the drive casing having ramps and the other being smooth,
a pair of sets of rollers freely mounted between the drive casing and each of said driven hub members for circumferential movement between a released position and a driven position against the ramps by a wedging action of the rollers thereagainst,
a pair of cupped annular cages for the rollers freely mounted concentrically in opposed relation on the driven members for adjustable rotation relative thereto and having internal end flanges overhanging the bores,
the drive casing includes annular boss portions engaging the flanges of the cages to damp movements of the cages,
a plurality of cylindrical plugs of friction material slidable in the bores,
and means for pressing the plugs against the end flanges of the cages.

11. In a differential driving mechanism, a rotatable drive casing,
a pair of driven hub members coaxially mounted in end to end relation in the drive casing for independent rotation and having end bores,
one of the hub members and the drive casing having ramps and the other being smooth,
a pair of sets of rollers freely mounted between the drive casing and each of said driven hub members for circumferential movement between a released position and a driven position against the ramps by a wedging action of the rollers thereagainst,
a pair of cupped annular cages for the rollers freely mounted concentrically in opposed relation on the driven members for adjustable rotation relative thereto and having internal end flanges overhanging the bores,
a plurality of cylindrical plugs of friction material slidable in the bores,
means for pressing the plugs against the end flanges of the cages,
and damping means coupling the cages to the drive casing.

12. The differential drive mechanism of claim 11 wherein the rollers are crowned.

* * * * *